INVENTOR.
Harry E. Sloan
BY
Stewart & Sprugel
Attorneys.

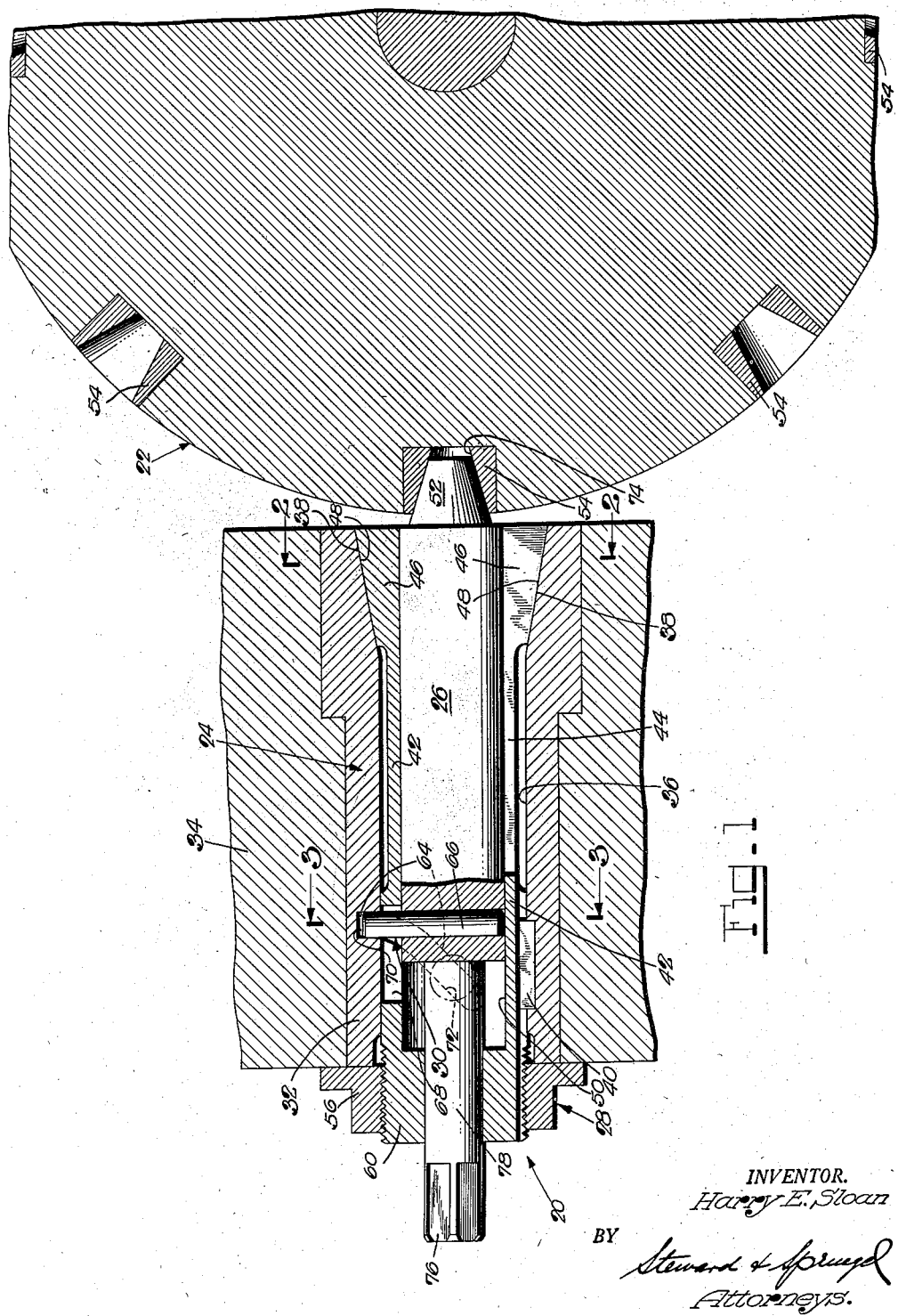

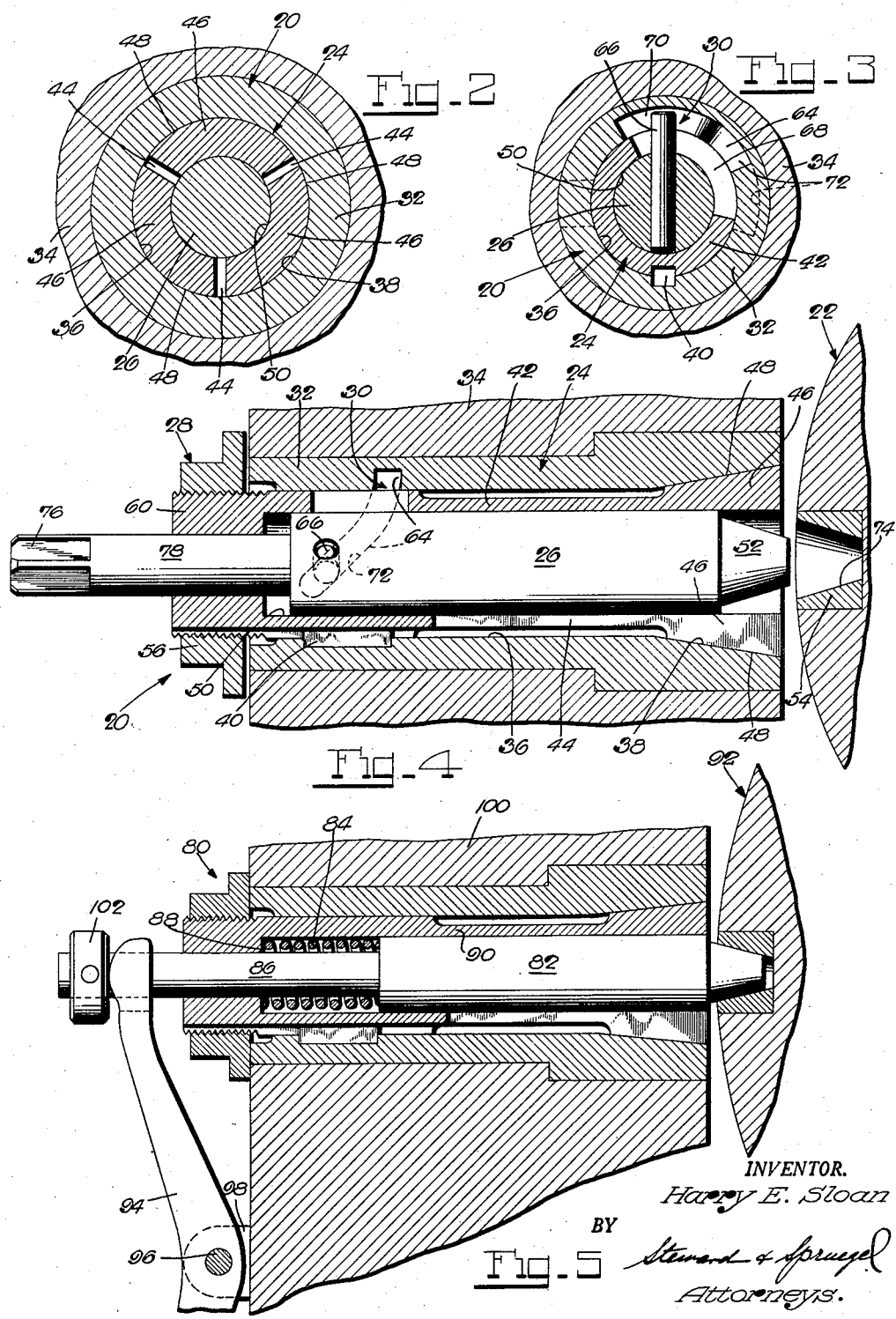

Feb. 17, 1959 H. E. SLOAN 2,873,822
BOLT-TYPE LOCKING MECHANISMS FOR INDEXING DEVICES
Filed Feb. 3, 1954 6 Sheets-Sheet 4

INVENTOR.
Harry E. Sloan
BY
Steward & Sprigel
Attorneys.

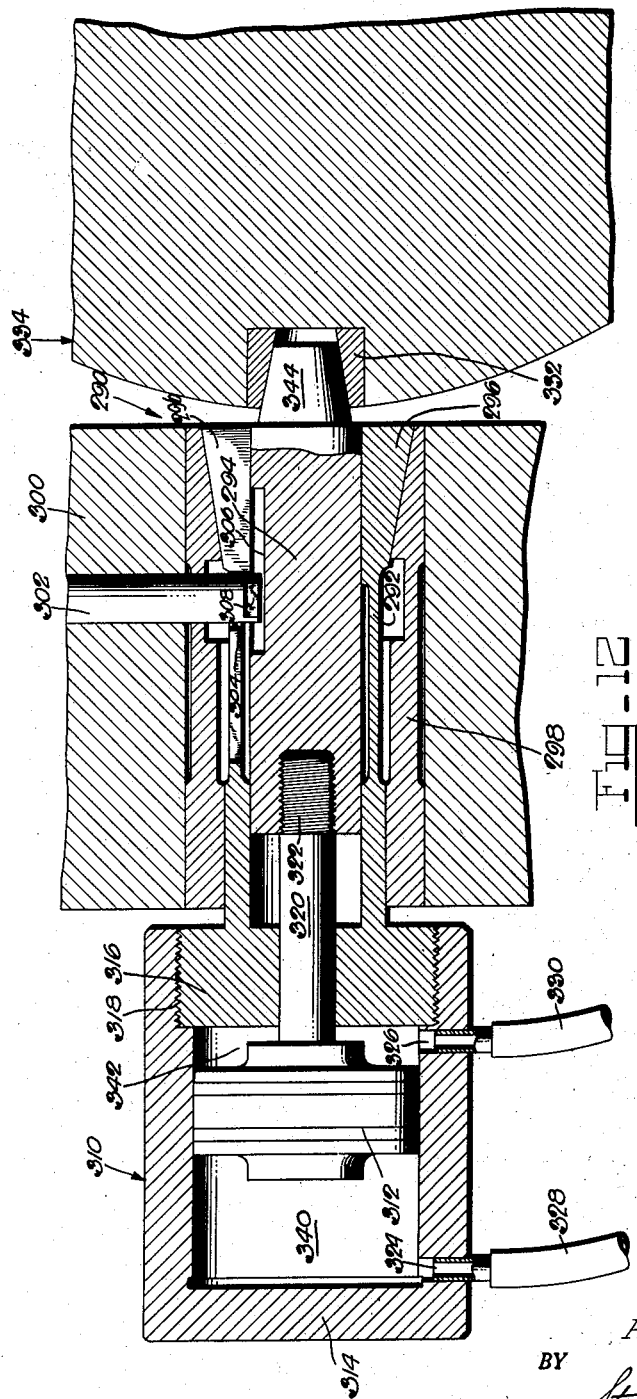

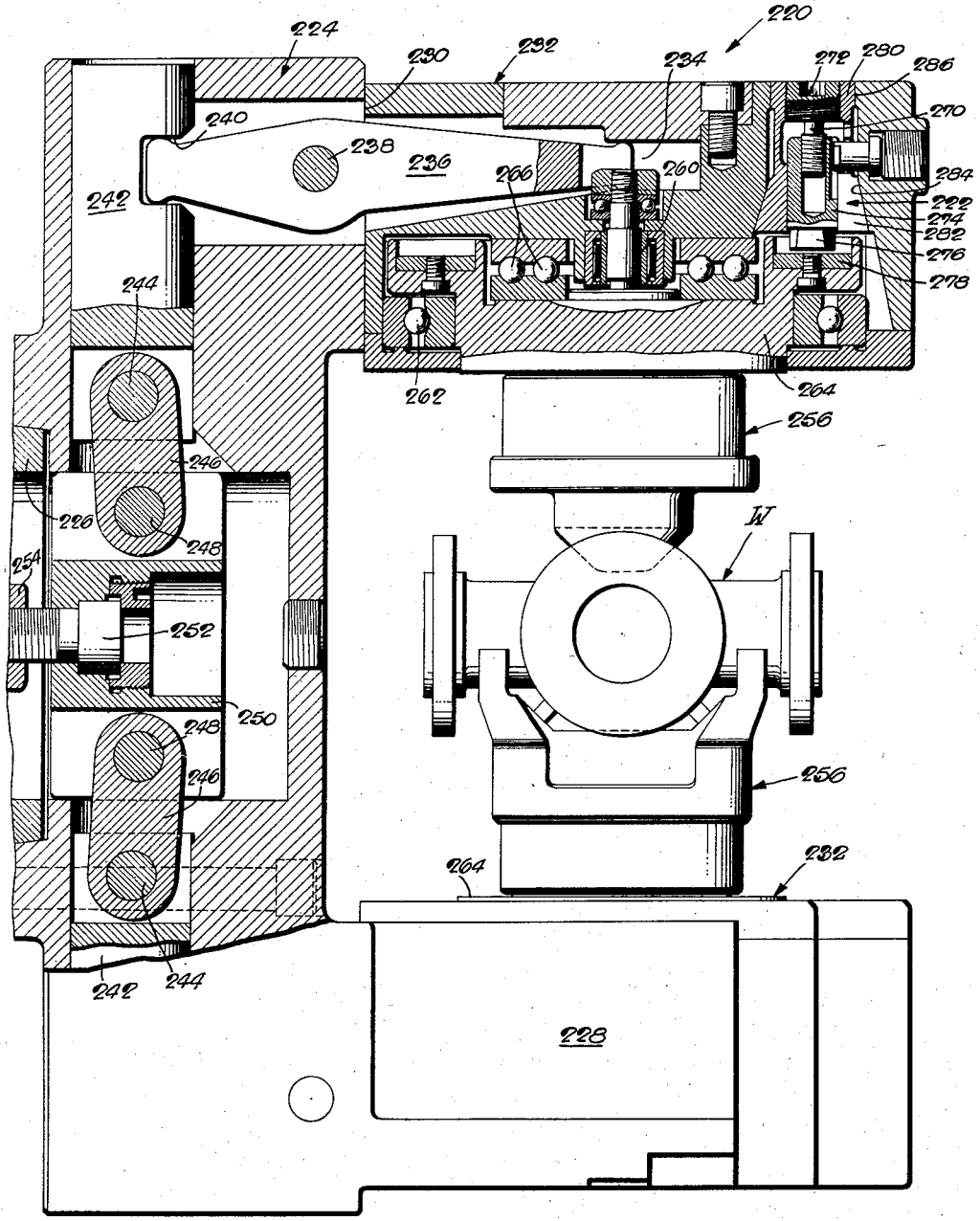
Fig_13

United States Patent Office 2,873,822
Patented Feb. 17, 1959

2,873,822
BOLT-TYPE LOCKING MECHANISMS FOR INDEXING DEVICES

Harry E. Sloan, Hartford, Conn., assignor to The Cushman Chuck Company, Hartford, Conn., a corporation of Connecticut Application February 3, 1954, Serial No. 407,946

19 Claims. (Cl. 188—68)

This invention relates to locking mechanisms for indexing devices, such as turrets, for instance, and more particularly to mechanisms of the bolt-interlock type.

Previous locking mechanisms of this type have a lock pin or bolt which customarily has a sliding fit in a mounted steel bushing and is axially movable therein into and from interlock with an associated indexing device turret in each of its various stop positions. While this previous type of locking mechanism is satisfactory for many purposes, it is utterly useless in many cases where precision operations require that an indexing device have not even the slightest play or give in any of its predetermined stop positions. To increase the accuracy of the positioning action of this locking mechanism, so as to meet the exacting demands of many precision operations, is impossible because the imperative sliding fit of the lock-bolt in its bushing will inevitably permit some lateral play of the former in the latter and, hence, will permit some angular give or play of an indexing device locked thereto, especially when the latter is subjected to forces which tend to move or turn the same, as the case may be. Accordingly, it is impossible wholly to avoid angular play or give of an indexing device in any of its locked positions even when the associated locking mechanism is new and the lock-bolt is carefully lapped in its bushing, and this play of the inedxing device becomes even worse as the lock-bolt becomes looser in its bushing through prolonged use.

It is the primary aim and object of the present invention to provide locking mechanism of this type of which the lock-bolt is axially slidable in a fixed guide into and from interlock with an associated indexing device in any of its predetermined stop positions, yet will in its interlocked position have no lateral play or give whatsoever in its guide and, hence, will permit no play or give of the locked indexing device even after long use.

It is another object of the present invention to provide locking mechanism of this type which has the aforementioned playless lock characteristics and is nevertheless easier to manufacture and install, and hence is less expensive, than previous locking mechanisms of this type.

It is a further object of the present invention to provide locking mechanism of this type which requires less accurate machining and fitting of its parts than those of previous locking mechanisms of this type, and which is nevertheless assuredly playless in its locking action when new, and is as assuredly playless in its locking action and resists any give or play tendency of an indexing device locked thereto as the mechanism is being used more and more, due to, and not despite, the normally ensuing wear of the coacting parts of the mechanism.

The present invention consists essentially in the use of a chuck in a locking device for indexing apparatus, in which the chuck is adapted to support a lock-bolt so that when the chuck is open the lock-bolt can be moved axially into and out of locking position but, when the lock-bolt is in its locking position, the chuck will grip the lock-bolt, thereby holding it rigidly and accurately in place and preventing any play whatsoever between the parts being indexed. In one specific embodiment of the invention, the chuck in which the lock-bolt is supported may be a collet which is carried by a firm support and the jaws of which are closed on the lock-bolt in its locking position, and are opened for the retraction of the latter to permit intermittent motion of an associated indexing device, thereby to permit easy sliding of the lock-bolt into and from its locking position when the collet is open, and clamping of the lock-bolt, on closure of the collet, to the support as firmly as if it were an integral part of the latter.

Another feature of the present invention is the provision of a locking mechanism of this type of which the aforementioned bolt and collet are operatively connected by a single element which, on operation in one direction drives the bolt into interlock with an associated indexing device and closes the collet on the bolt only when the latter is in firm interlock with the indexing device, and on operation in the opposite direction first opens the collet and only then retracts the bolt from the indexing device.

The aforementioned operating element may be, for example, a screw stud which is threadedly received by the lock-bolt and bears against a shoulder, hereinafter sometimes referred to as the jaw-actuating portion, in the collet body, so that on rotation of the screw stud in one direction the bolt will first be advanced toward the associated indexing device into full interlock therewith, and the screw stud will then force the bolt into even firmer interlock with the indexing device and simultaneously back up against the shoulder in the collet to close the latter on the bolt, and on rotation of the screw stud in the opposite direction the same will back away from the shoulder in the collet so that it may be opened, whereupon the released bolt will be retracted from the indexing device.

Moreover, the jaw-actuating portion or shoulder in the collet body may be threaded so as to receive a second screw thread on the stud opposite in direction to the thread thereof which is received in the lock-bolt, to achieve, by this plural thread arrangement on the stud, quicker advance or retraction of the bolt for a given number of turns of the stud, and to provide means for positively releasing the grip of the collet on the bolt.

In one of the specific embodiments of the invention hereinafter more fully described, a particularly desirable arrangement is in making one of the aforementioned dual threads on the screw stud of quite considerable pitch to expedite the advance and retraction of the lock bolt, while the other thread on the stud is of considerably smaller pitch to lock the same to the part in which it is received with a tightness which assuredly is sufficient to prevent accidental rotation of the stud and, hence, loosening of the bolt in its locking position when the latter is subjected to even exceptionally large compressive stresses and other disturbing forces from the locked indexing device which tend to turn the stud.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a longitudinal section through an installed locking mechanism embodying the present invention;

Figs. 2 and 3 are cross-sections through this locking mechanism as taken on the lines 2—2 and 3—3, respectively, of Fig. 1;

Fig. 4 is a section similar to Fig. 1, showing the locking mechanism in a different operating position;

Fig. 5 is a longitudinal section through an installed locking mechanism embodying the present invention in a modified manner;

Fig. 12 is a longitudinal section through an installed locking mechanism embodying the present invention in still another modified manner; and Fig. 13 is a part-sectional and part-elevational view of an indexing-type chuck embodying a locking mechanism of the type shown in Figs. 6 to 8.

Figure 6:
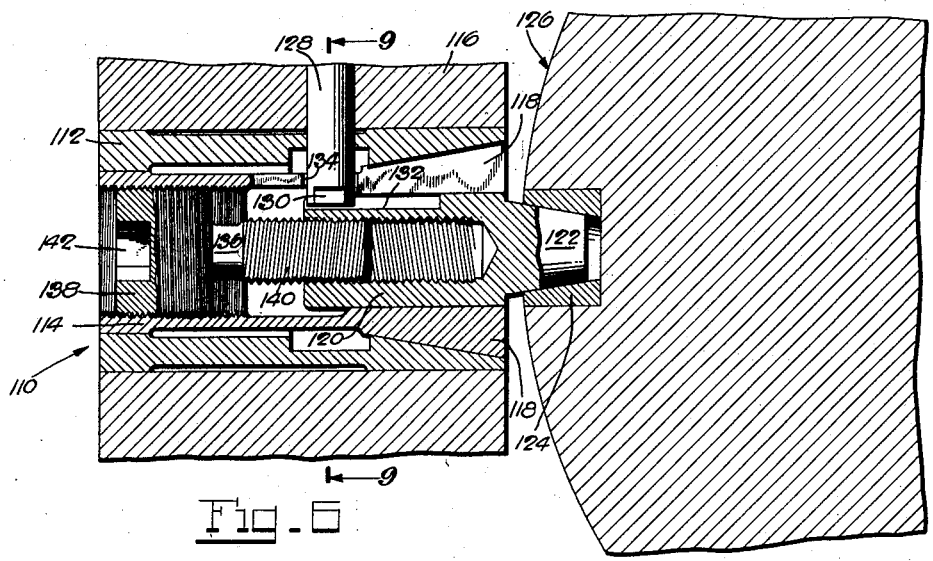
Fig. 6 is a longitudinal section through an installed locking mechanism embodying the present invention in another modified manner.

Referring to the drawings, and more particularly to Figs. 1 to 4 thereof, the reference numeral 20 designates mechanism for locking an indexing device 22, such as a rotary turret, for instance, in a predetermined position or positions. The locking mechanism 20 comprises a collet chuck 24, a lock-bolt 26, a collet operating device 28, and an axial lock 30 for the bolt 26.

The collet chuck 24 comprises an outer part or sleeve 32 which is firmly mounted in a fixed support 34, and has an axial bore 36 which at its front end is frusto-conical as at 38. Axially slidable in the bore 36 of the outer chuck part 32, and splined thereto as at 40, is a collet body 42. The collet body 42 is provided with a plurality of equiangularly spaced longitudinal slots 44 to form integral jaws 46 which may radially be expanded and contracted (Figs. 1 and 2). The jaws 46 are externally tapered as at 48 to cooperate with the inner frusto-conical surface 38 in the outer chuck part 32 in opening and closing the jaws. Thus, the jaws 46 will open and close on axial movement of the collet body 42 in the outer chuck part 32 to the right and left, respectively, as viewed in Figs. 1 and 4.

The aforementioned lock bolt 26 is rotatable and axially slidable in a central annular recess 50 in the collet body 42, and is provided at its forward end with a locking head 52 which in this instance is frusto-conical and adapted to be received and seated in any one of a number of angularly spaced socket members 54 in the exemplary indexing device 22 to hold the same in any one of a number of predetermined angular positions. To release the indexing device 22 for movement into another one of its predetermined angular positions, the lock-bolt 26 is retracted into the position shown in Fig. 4.

The aforementioned collet operating device 28 is, in the present instance, in the form of a nut 56 which is received by the externally threaded rear end 60 of the collet body 42. The nut 56 bears against the chuck part 32 and support 34, and the jaws 46 on the collet body will close on tightening nut 56 as will be readily understood. When nut 56 is loosened, an external force such as the rap of a hammer on the rear end 60 of collet body 42 will open the jaws of the collet.

The aforementioned axial lock 30 for the bolt 26 is in this instance formed by an internal cam groove 64 in the outer chuck part 32, and a follower pin 66 in the lock bolt 26. The follower pin 66 extends through an arcuate slot 68 in the collet body 42 and into the cam groove 64 (see also Fig. 3). The cam groove 64 is so arranged that the bolt 26 will be held against axial movement from its locking position (Fig. 1) on turning the bolt counterclockwise as viewed in Fig. 3 into the position there shown. In this position, the follower pin 66 cooperates with an end portion 70 of the cam groove 64 which is only slightly inclined to the longitudinal axis of the outer chuck part 32 and, hence, resists any back-up of the bolt 26 from its locking position with a powerful wedge action. On turning the lock-bolt 26 from its locking position in the opposite direction, its follower pin 66 will cooperate with another portion 72 of the cam groove 64 which has such a steep inclination to the longitudinal axis of the outer chuck part 32 as to cause retraction of the bolt 26 into the inoperative position shown in Fig. 4 on a relatively short turn of the latter.

Assuming that the lock bolt 26 is in its retracted or inoperative position (Fig. 4) and that the indexing device 22 has been moved to bring one of its socket members 54 into alignment with the bolt 26, the latter is advanced into its locking position (Fig. 1) in which the exemplary frusto-conical head 52 of the same becomes firmly seated on the internal frusto-conical surface 74 of the aligned socket member 54 in the indexing device. The advance of the bolt 26 from the inoperative position in Fig. 4 to the locking position in Fig. 1 is achieved by the aforementioned cam groove 64 in the outer chuck part 32 and the follower pin 66 on the bolt 26 which cooperate to that end on turning the bolt counterclockwise as viewed in Fig. 3 into the position there shown. Rotation of the lockbolt 26 into this position may conveniently be accomplished by a wrench or any other suitable tool that may be applied to a square or other connector end 76 on a rear shank 78 of the bolt 26 which extends through the rear end 60 of the collet body 42. After thus advancing the bolt 26 into its locking position and arresting it against axial backup therefrom, the nut 56 on the threaded rear end 60 of the collet body 42 is tightened so as to draw the latter sufficiently into the outer chuck part 32 to cause closure of the jaws 46 on the bolt 26. In order to release the indexing device 22, the jaws 46 on the collet body 42 are first opened by loosening the nut 56 and moving the collet body 42 forward slightly by means of an external force applied to its rear end 60 so as to break the grip of the jaws 46 on the bolt 26.

Whereupon the bolt 26 may be retracted into its inoperative position (Fig. 4) on turning the same to bring its follower pin 66 into cooperation with the steeply inclined portion 72 of the cam groove 64 in the outer chuck part 32.

While there are forces that tend to retract the bolt 26 ever so slightly from its locking position when the jaws 46 on the collet body 42 close on the bolt, these will not succeed in loosening the tight interfit between the aligned socket member 54 and the frusto-conical bolt head 52 seated therein. Moreover, follower pin 66 being located in the end portion 70 of cam groove 64, as seen in Fig. 1, effectively prevents retraction of the bolt 26 as the collet jaws are clamped onto it. The tight interfit between the socket member and the seated bolt head therein will assuredly prevent any play or give between them even when these parts show some wear after prolonged use. In addition, the collet chuck 24 is highly advantageous in that the same permits ready sliding of the lock-bolt into and from its locking position, yet holds the bolt in its locking position as firmly to the fixed support 34 as if it were in integral part of the latter and prevents any give or play between the indexing device 22 and the support 34.

Fig. 5 shows a modified locking mechanism 80 which may in all respects be like the described locking mechanism 20, except that the lock-bolt 82 is normally urged by a compression-type spring 84 into its locking position. The spring 84 surrounds the rear shank 86 of the bolt 82 and is interposed between the latter and an internal annular shoulder 88 in the collet body 90. To retract the lock bolt 82 for the release of the indexing device 92, there is provided an operating lever 94 which is pivoted at 96 on rearwardly extending lugs 98 on the fixed support 100 and is engageable with a collar 102 on the rear shank 86 of the lock bolt. The lever 94 may be operated manually or in any other suitable way to cause retraction of the lock-bolt 82 from its locking position.

Figure 7:
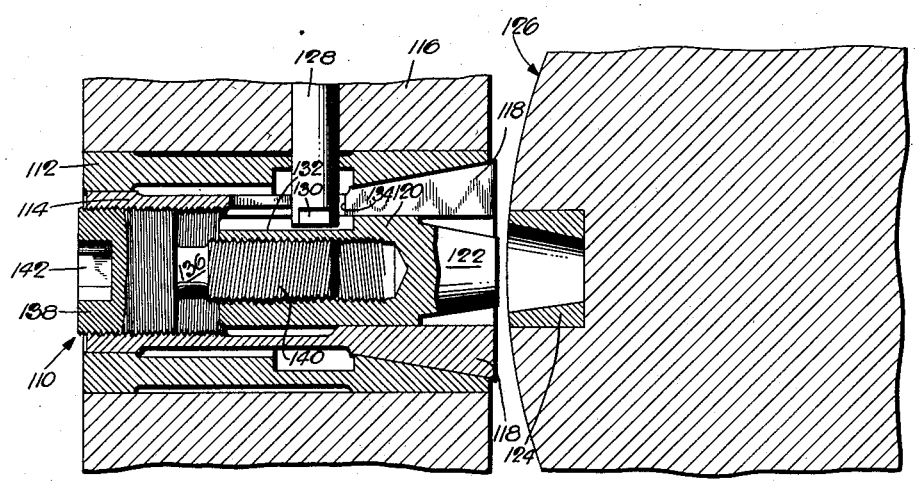
Figs. 7 and 8 are sections similar to Fig. 6, but showing the modified locking mechanism in different operating positions, respectively.

Fig. 6 shows another modified locking mechanism 110 which is even more advantageous than either of the previously described locking mechanisms. The arrangement of the outer chuck part 112 and of the collet body 114 in the fixed support 116 may be as in the previously described locking mechanisms, i. e., the outer chuck part 112 is firmly mounted in the fixed support 116 and the collet body 114 is axially slidable in the outer chuck part 112 in opposite directions to cause opening and closing of the jaws 118 of the collet body. The lock-bolt 120 is axially slidable in the collet body 114 to project its lock head 122 into a socket member 124 in an indexing device 126 (Fig. 6) and retract it therefrom (Fig. 7). In this instance, the lock-bolt 120 and the collet body 114 are splined to the outer chuck part 112 by a stud 128 which extends through the support 116 and the outer chuck part 112 and holds the latter against axial movement in the former. More particularly, a flattened end 130 of the stud 128 extends into a longitudinal groove 132 in the lock-bolt 120, while the stud 188 extends with its full diameter in a longitudinal groove 134 in the collet body 114 which is of sufficient length to permit the necessary axial motion of the latter for opening and closing the jaws 118 (Figs. 6 and 7).

Operatively connecting the collet body 114 and lock-bolt 120 is a screw stud 136 which has a threaded head 138 received in the collet body 114, and a threaded shank 140 received in the lock-bolt 120. The threads on the head 138 and shank 140 of the screw stud 136 are directed opposite to each other, and in the example shown the treads on the head 138 and shank 140 are right-hand and left-hand threads, respectively. The head 138 of the screw stud 136 is in this instance provided with a socket 142 for the reception of an Allen-type wrench with which to turn the screw stud in either direction.

Assuming that the lock-bolt 120 is in its retracted or inoperative position and that the socket member 124 on the indexing device 126 is approximately lined up with the lock bolt (Fig. 7), the indexing device may then be locked in accurate predetermined position by advancing the bolt 120 into its locking position (Fig. 6). To achieve the advance of the bolt 120 into its locking position, the screw stud 136 is turned clockwise as viewed from the left of Fig. 7. Clockwise rotation of the head 138 of the screw stud with its exemplary right-hand thread will cause the same to screw deeper into the collet body 114 and accordingly advance the lock-bolt 120 toward the aligned socket member 124 in the indexing device 126. Further, clockwise rotation of the shank 140 of the screw stud with its exemplary left-hand thread will cause unscrewing of the same from the lock-bolt 120, with the result that the latter is further advanced toward the aligned socket member 124 of the indexing device 126. Accordingly, the advance motion of the lock-bolt 120 due to the clockwise drive of the shank 140 of the screw stud is superimposed on its advance motion due to the clockwise drive of the head 138 of the screw stud, or in other words the motions imparted to the lock bolt 120 by the clockwise drive of the head 138 and shank 140 of the screw stud are additive and are in this instance forward motions of the lock-bolt toward the indexing device. Accordingly, the lock-bolt 120 is advanced fairly rapidly into its locking position on comparatively few clockwise turns of the screw stud 136.

Figure 8:
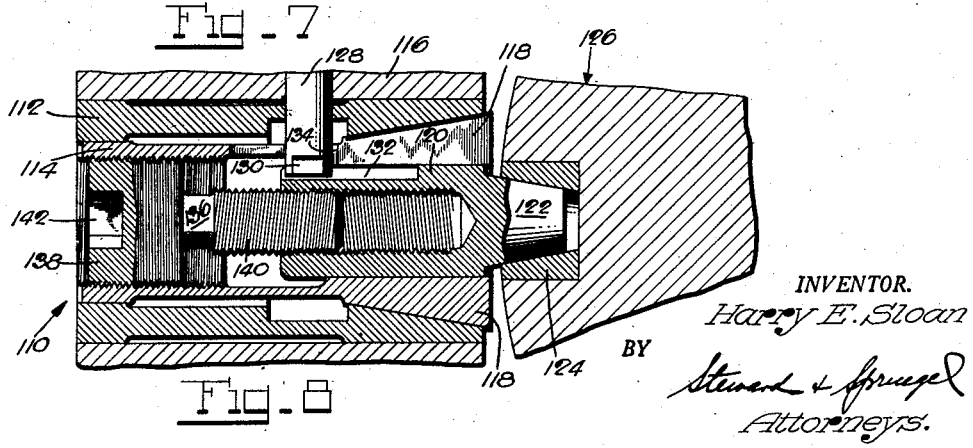
Figure 9:
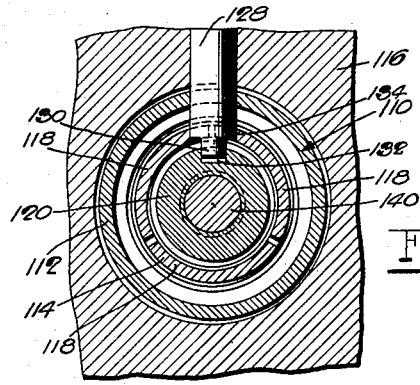
Fig. 9 is a cross-section taken on the line 9—9 of Fig. 6.

During the above-described clockwise drive of the screw stud 136 only the lock-bolt 120 is advanced, and the jaws 118 on the collet body 114 remain open as indicated by the exaggerated projection of their forward ends beyond the outer chuck part 112 in Figs. 7 and 8. This is due to the fact that the advance of the lock-bolt 120 offers far less resistance than the inward draw of the collet body 114 into the outer chuck part 112 for jaw-closing purposes, and the screw stud 136 will follow the path of least resistance in its axial motion. Thus, until the lock head 122 of the bolt 120 becomes on its advance seated in the aligned socket member 124 in the indexing device 126, the jaws 118 on the collet body 114 will remain open (Fig. 8). Thereafter and on continued clockwise rotation of the screw stud 136, the lock head 122 of the bolt 120 will be driven increasingly tightly into the aligned socket member 124 in the indexing device until the resistance to further forward motion encountered by the lock-bolt exceeds the resistance encountered by the collet body 114 to its inward draw into the outer chuck part 112 for jaw-closing purposes. It is only then that the collet body 114 is drawn into the outer chuck part 112 to close the jaws 118 firmly on the lock-bolt 120 (Fig. 6) and thereby lock the indexing device 126 to the fixed support 116 as firmly as if it were an integral part thereof.

In order to release the indexing device 126, the lock bolt 120 is retracted into the inoperative position shown in Fig. 7. To achieve this end, the screw stud 136 with its exemplary threads is turned counterclockwise as viewed from the left of Fig. 6. On thus turning the screw stud 136 in counterclockwise direction, the bolt 120 will not at first move axially due to the fact that it is tightly gripped by the collet jaws 118. Stud 136 will, therefore, because of the oppositely disposed threads on its head 138 and shank 140, force the collet body 114 forwardly into its open position (Fig. 8). Thereafter and on continued counterclockwise rotation of the screw stud 136, the head 138 of the latter will screw rearwardly in the collet body 114 and its ensuing axial motion will be transmitted to the lock-bolt 120 and cause retractive motion of the lock head 122 of the latter from the aligned socket member 124 in the indexing head. Simultaneously with the rearward screwing of the head 138 of the screw stud 136 in the collet body 114 the threaded shank 140 of the screw stud will screw deeper into the lock bolt 120 and the ensuing axial motion imparted to the lock-bolt is retractive and additive to the retractive motion imparted to the latter by the head 138 of the screw stud. Accordingly, the lock-bolt 120 is retracted as rapidly on as few counterclockwise turns of the screw stud 136 as the same is advanced on clockwise turns of the latter.

The action of the lock-bolt 120 is, in view of its association with the collet chuck, highly unique and advantageous. Thus, on rotation of a single element, i. e. the screw stud 136, the lock head 122 of the bolt 120 will first be advanced into its locking position and will become firmly seated in the aligned socket member of the indexing device without encountering any appreciable friction in its "bushing," i. e. the collet body 114, and it is only thereafter that the jaws 118 on the collet body are being firmly closed on the lock-bolt while the latter is being held with a maximum force in seating engagement with the aligned socket member in the indexing device. Conversely, on rotation of the same single element in the opposite direction, the collet body 114 is first permitted to open its jaws 118 from gripping engagement with the lock-bolt 120, and it is only thereafter that the latter is retracted without encountering any more than negligible friction in the collet body. Further, the arrangement of the dual threads on the screw stud 136 such that their separate effects on the relative axial motion of the lock-bolt 120 and collet body 114 are additive makes for a quick axial response of these parts to a comparatively small number of turns of the screw stud in either direction. This axial response of the lock-bolt 120 and collet body 114 to rotation of the screw stud 136 may even be accelerated by making the threads on the screw stud of larger pitch.

In the example shown in Figs. 6 to 8, the thread on the shank 140 of the screw stud 136 is of rather large pitch to achieve a quick axial response of the lock-bolt 120 on rotation of the screw stud, while the thread on the head 138 of the screw stud is of considerably smaller pitch. While the thread of smaller pitch on the head 138 of the screw stud 136 does not add a great deal to the relative axial motion of the parts 114 and 120 springing from the thread of larger pitch on the shank 140 of the screw stud, the thread of smaller pitch performs the highly desirable function of locking the head of the screw stud to the collet body with a tightness which assuredly is sufficient to prevent unauthorized rotation of the screw stud and, hence, loosening of the bolt in its locking position when the latter is subjected to even exceptionally large compressive stresses and other disturbing forces from the locked indexing device which tend to turn the screw stud. Of course, the same beneficial result will be obtained by making the thread on the head 138 of the screw stud 136 of larger pitch and the thread on the shank 140 of the screw stud of smaller pitch.

Figure 10:
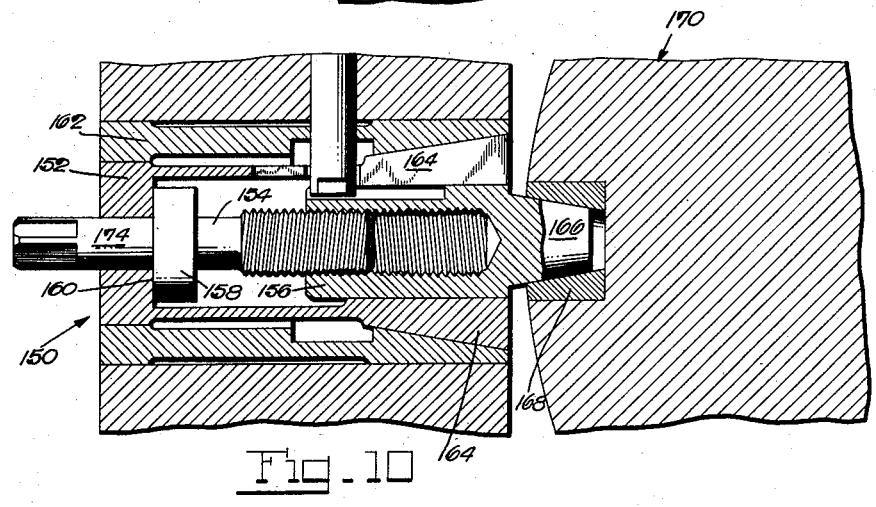
Fig. 10 is a longitudinal section through an installed locking mechanism embodying the present invention in another modified manner.

Fig. 10 shows another modified locking mechanism 150 which is similar to that of Figs. 6 to 8, except that the collet body 152 is not threadedly connected with the screw stud 154. Instead, the screw stud 154, which is threadedly connected with the lock-bolt 156, is provided with a collar 158 which bears against an internal annular shoulder 160 in the collet body 152. In the example shown, the thread on the screw stud 154 is left-handed, wherefore on rotation of the same clockwise as viewed from the left in Fig. 10 the collar 158 will back against the collet body 152 and advance the bolt 154 into the locking position shown without drawing the collet body 152 into the outer chuck part 162 for closing the jaws 164. It is only after the lock head 166 of the bolt 156 is firmly seated in the aligned socket member 168 in the indexing device 170 that on continued clockwise rotation of the screw stud 154 the collet body 152 will be drawn into the outer chuck part 162 for closing the jaws 164 firmly on the lock-bolt. Conversely, to release the indexing device, the screw stud 154 is turned in the opposite direction, thus permitting the collet body 152 to be forced forward slightly by some external means (not shown) or by simply rapping the rear end of the collet body 152 with a hammer. Whereupon the jaws 164 on the collet body 152 move out of gripping engagement with the lock-bolt and into their normal disposition before the lock-bolt is permitted to retract from the indexing device. Consequently, insofar as the successive locking and unlocking actions of the bolt 156 and the jaws 164 on the collet body are concerned, these are quite similar to the successive locking and unlocking actions of the bolt 120 and the jaws 118 on the collet body 114 of the described locking mechanism in Figs. 6 to 8. Of course, the single thread on the present screw stud 154, if comparable in pitch to that of the thread on the shank 140 of the screw stud 136 in Figs. 6 to 8, will require more turns of the screw stud 154 in order to achieve relative axial motion of the parts 152 and 156 through a comparable range, as will be readily understood. Moreover unless the locking mechanism 150 is disposed other than horizontally and unless the lock bolt 156 will gravitate from the aligned socket member 168 in the indexing device when the screw stud 154 is turned for retraction of the lock-bolt, an external retractive force will have to be applied to the rearwardly projecting shank 174 of the screw stud 154, or a spring (not shown) may suitably be provided to act on the screw stud to the same effect.

While in the exemplary locking mechanism 150 in Fig. 10 the screw stud 154 is threadedly connected with the lock-bolt 156 and backs with its collar 158 against the collet body 152, all the advantages of this locking mechanism may also be achieved by threadedly connecting the screw stud with the collet body and backing the former against the lock bolt, as will be readily understood.

Figure 11:
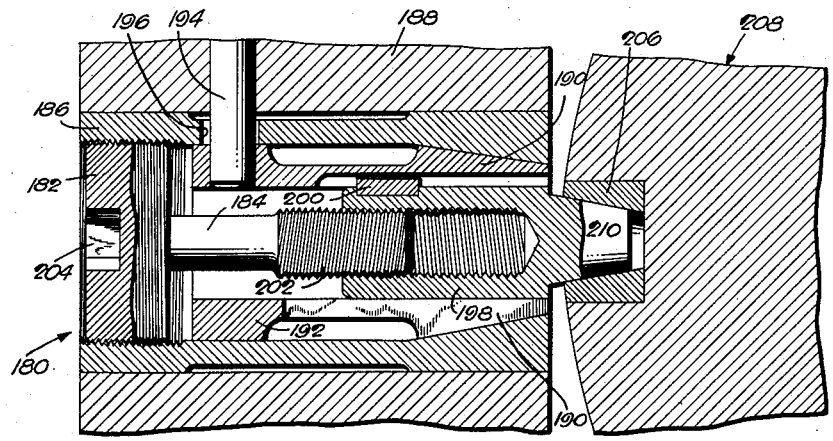
Fig. 11 is a longitudinal section through an installed locking mechanism embodying the present invention in a further modified manner.

Fig. 11 shows still another modified locking mechanism 180 which is similar to that of Figs. 6 to 8, except that the head 182 of the screw stud 184 is threadedly connected with the outer chuck part 186 which in this instance is axially slidable in the fixed support 188 for opening and closing the jaws 190 on the collet body 192. This requires that the collet body 192 be held axially immovable relative to the support 188, and the former is to that end pinned to the latter as at 194. The pin 194 extends through a slot 196 in the outer chuck part 186 which is of sufficient length to permit the necessary axial motion of the latter for jaw-opening and closing purposes. The lock-bolt 198, which is splined at 200 to the collet body 192, is connected with the threaded shank 202 of the screw stud 184. Due to the actuation of the jaws 190 on the fixed collet body 192 on axial motion of the outer chuck part 186 as mentioned, the tapers of the latter and of the jaws 190 are opposite to those of the corresponding parts 112 and 118 of the described locking mechanism in Figs. 6 to 8.

As before, the threads on the head 182 and the shank 202 of the screw stud 184 are opposite in direction, and in the example shown the threads on the head and shank of the screw stud are right-hand and left-hand threads, respectively. Accordingly, on rotation of the screw stud 184 clockwise as viewed from the left of Fig. 11, by means of an Allen wrench engaged in the socket 204 in the head 182 of the screw stud, for instance, the threads of both, the head 182 and the shank 202 of the screw stud combine to move the lock-bolt 198 axially toward the aligned socket member 206 in the indexing device 208. This combined effect of the head and shank of the screw stud on the forward progress of the lock-bolt will endure until the lock head 210 will become firmly seated in the aligned socket member 206 in the indexing device 208, and it is only thereafter that on continued clockwise rotation of the screw stud the outer chuck part 186 will be backed up sufficiently to close the jaws 190 on the collet body 192 firmly on the lock-bolt. To release the indexing device 208, the screw stud 184 is turned in the opposite direction, with the result that the outer chuck part 186 is first forced to the right as viewed in Fig. 11 to release the jaws, in a manner similar to that described in connection with the embodiment of the invention shown in Figs. 6 to 9. On continued rotation of the screw stud in the same direction the lock-bolt will retract from the indexing device 208 without encountering any more than negligible friction in the collet body 192. The instant locking mechanism 180 has all the advantages of the described locking mechanism in Figs. 6 to 8.

Fig. 12 shows a further modified locking mechanism 290 which features fluid-pressure operation of the collet body 292 and the lock bolt 294. The collet body 292 is provided with the jaws 296 and is axially slidable in the outer chuck part 298 for jaw opening and closing purposes. The outer chuck part 298 is immovably mounted in the fixed support 300. The lock-bolt 294 and collet body 292 are splined to the outer chuck part 298 by means of a pin 302 which is mounted in the support 300 and outer chuck part 298 and projects through a slot 304 in the collet body and into a longitudinal groove 306 in the lock-bolt. More particularly, a flattened end 308 of the pin 302 is received with a sliding fit in the groove 306 in the lock-bolt, while the pin 302 extends with its full diameter through the slot 304 in the collet body. The slot 304 in the collet body is of sufficient length to permit the necessary axial motion of the latter for jaw opening and closing purposes.

The collet body 292 carries a cylinder 310 in which is slidable a double-acting piston 312 that is connected with the lock-bolt 294. In the present example, the cylinder 310 is formed by a casing 314 and an end flange 316 on the collet body 292 on which the casing may conveniently be screwed as at 318. The rod 320 of the piston 312 may conveniently be screw-connected with the lock-bolt 294 as at 322. The cylinder 310 is provided at its opposite ends with ports 324 and 326, respectively, which through flexible hose connections 328 and 330 are connected with a suitable valve (not shown) that may be actuated to admit fluid under pressure to either end of the cylinder and simultaneously vent the other end thereof.

Supposing that the lock-bolt 294 is retracted from an aligned socket member 332 in the indexing device 334 and that the latter is to be locked in accurate position by the instant mechanism, the aforementioned valve is actuated to admit fluid under pressure into the left end 340 of the cylinder 310 and simultaneously vent the right end 342 thereof. As soon as the admitted fluid under pressure in the cylinder end 340 exerts itself on the piston 312, the latter will immediately be forced to the right and advance the bolt 294 into the locking position shown. When the lock head 344 of the bolt 294 becomes firmly seated in the socket member 332 in the indexing device the resistance to further advance motion of the bolt exceeds the resistance offered by the outer chuck part 298 to the inward draw of the collet body 292 for jaw-closing purposes, and it is only then that the cylinder 310 will, by the fluid under pressure therein, be forced to the left sufficiently to cause closure of the collet jaws 296 into firm gripping engagement with the lock-bolt.

In order to release the indexing device 334, the bolt 294 is retracted from its locking position on actuating the aforementioned valve to admit fluid under pressure into the cylinder end 342 and simultaneously vent the other cylinder end 340. Since the bolt 294 is firmly gripped by the collet jaws 296, the piston 312 at first remains stationary when the cylinder end 342 is placed under pressure and the opposite end 340 is vented. Consequently, the cylinder 310 is forced by fluid under pressure therein to the right, as viewed in Fig. 12, sufficiently to permit the collet jaws to expand from gripping engagement with the bolt 294. The piston 312 is then free to move to the left and to retract the lock-bolt.

While many important advantages of the several described locking mechanisms, springing from the provision of a collet chuck and its various types of operating connections with a lockbolt, have already been explained, hereinbefore, there are additional important advantages yet to be explained. Thus, locking mechanisms of the kind shown and described herein have the aforementioned hitherto unattainable play-less lock characteristics, and are nevertheless easier to manufacture and install, and hence are less expensive, than previous locking mechanisms of the bolt and bushing type. Locking mechanisms of the kind shown and described herein require less accurate machining and fitting of their parts than those of previous locking mechanisms, and they are nevertheless assuredly playless in their locking action when new, and are as assuredly playless in their locking action and resist any give or play tendencies of indexing devices locked thereto due to, and not despite, the normally ensuing wear of the coacting parts of the mechanisms. Thus, as the parts of the collet chuck and the associated lock-bolt wear-in in the course of their normal use, their cooperation becomes more accurate. Also since accurate cooperation of these parts and their powerful locking action depends in the final analysis on the expansion and contraction of the jaws of the collet chuck, it becomes obvious that these parts require neither overly accurate machining nor overly accurate fitting. The embodiments of the invention described hereinabove require, for the achievement of their unique functions, an exceedingly small number of simple parts, wherefore these locking mechanisms lend themselves quite readily to highly efficient mass production at low cost. Furthermore, the several forms of locking mechanisms shown and described herein lend themselves to easy repair or ready replacement of any part or parts thereof without any adverse effect on their accurate performance and powerful locking action.

Fig. 13 shows one of many possible applications of any one of the hereinbefore described locking mechanisms. Thus, Fig. 13 shows, by way of example, the locking mechanism of Figs. 6 to 8 applied to an indexing chuck 220, which, with the exception of this locking mechanism, may be like the indexing chuck shown and described in the copending application of Harry E. Sloan, Jerome J. Rutherford and Herbert W. Hickey, Serial No. 360,136, filed June 8, 1953, now Patent No. 2,732,216. Accordingly, only those parts of the chuck 220 are described herein which are essential for an understanding of the function of the locking mechanism 222. The chuck 220 comprises a body 224 which is suitably mounted on the power spindle 226 of a lathe or other machine tool. The chuck body 224 is provided with diametrically opposite forward projections 228 in which are formed radial guideways 230 for non-rotatable jaw carriers 232. Each jaw carrier 232 has a socket portion 234 for the reception of one end of a rocker arm 236 which is pivoted intermediate its ends to the chuck body 224 as at 238. The other end of each rocker arm 236 is received in a peripheral groove 240 in a plunger 242 which is radially slidable in the chuck body 224. The inner end of each plunger 242 is pivotally connected at 244 with one end of a toggle link 246 the other end of which is pivotally connected at 248 with an actuator 250 that is axially slidable in the chuck body 224 and operatively connected at 252 with an operating bar 254. Accordingly, on shifting the operating bar 254, and hence the actuator 250, to the right from the position shown in Fig. 13, the plungers 242 will be drawn inwardly by the respective links 246 and the rocker arms 236 will accordingly be turned to retract the associated jaw carriers 232 and the jaws 256 thereon from the work W. Conversely, on shifting the operating bar 254 in the opposite direction, the jaw carriers 232 will be moved toward the work W and the jaws 256 thereon will grip the latter.

Journalled at 260 and 262 in each jaw carrier 232 is an indexing disc 264 on which the associated jaw 256 is directly mounted. A suitable thrust bearing 266 is provided in each jaw carrier 232 to take up the end thrust from the associated indexing disc 264 and jaw 256 thereon. The work W is exemplary of the kind which requires several operations in different angular positions, and the jaws 256 may remain in clamping engagement with the work during indexing steps of the jaws and the associated discs 264. These may be indexed by hand or in any other suitable manner. After each indexing step, the locking mechanism 222 is applied in a manner which is self-evident. Thus, the screw stud 270 is driven in the proper direction, by an Allen wrench engaged in the socket opening 272, for instance, to cause advance of the lock-bolt 274 toward the indexing disc 264 until its lock head 276 is firmly seated in the aligned socket member 278 in the disc, whereupon the collet body 280 will on continued rotation of the screw stud 270 back up and force its jaws 282 into firm gripping engagement with the lock-bolt 274. In the present instance, the internal frusto-conical surface 284 and bore 286 of the usual outer collet chuck part are machined directly into the jaw carrier. To release the indexing disc 264 and its jaw 256 for another indexing step, it is merely necessary to turn the screw stud 270 in the opposite direction, as will be readily understood.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A locking device for preventing relative movement between two members comprising, in combination, a chuck adapted to be rigidly mounted on one of said members and having gripping jaws, a lock-bolt supported in said chuck and arranged to be gripped and released by said jaws and to be axially movable with respect to said chuck, when released by said jaws, into and out of locking engagement with a second of said members, means for moving said bolt axially in said chuck into locking engagement with said second member and for actuating said chuck to grip said lock-bolt.

2. A locking device as defined in claim 1, wherein said chuck is of the collet type.

3. A locking device as defined in claim 2, wherein said chuck comprises an outer part and a collet part provided with an externally tapered portion adjacent said jaws, said collet part being received with a sliding fit in said outer part for opening and closing said jaws on relative axial movement of said parts.

4. A locking device for preventing relative movement between two members comprising, in combination, an outer chuck part mounted on one of said members and having a camming portion, a collet chuck part provided with externally tapered jaws and received with a sliding fit in said outer part with said jaws engaging the camming portion of said outer part so that the jaws are opened and closed upon relative axial movement of said chuck parts, an elongated lock-bolt supported in said collet chuck part and adapted when said jaws are open to be axially movable therein into and out of locking engagement with a second of said members, and means interconnecting said lock-bolt and one of said chuck parts for moving said bolt into and out of locking engagement with said second member and for moving said one chuck part axially relative to the other chuck part in order to effect gripping and releasing of said lock-bolt by said jaws.

5. A locking device for preventing relative movement between two members comprising, in combination, an outer chuck part mounted on one of said members, a collet chuck part provided with externally tapered jaws and received with a sliding fit in said outer part, said jaws being opened and closed on relative axial movement of said chuck parts, an elongated lock-bolt supported in said collet chuck part and adapted to be axially movable therein into and out of locking engagement with a second of said members, and means engaging one of said chuck parts and said bolt for moving them in opposite directions whereby said bolt is movable into and out of locking engagement with said second member and said one chuck part is movable axially relative to the other chuck part to effect gripping and releasing of said lock-bolt by said jaws.

6. A locking device as defined in claim 5, wherein said means comprises a power cylinder mounted on said one chuck part and having a double-acting piston therein connected to said bolt.

7. A locking device for preventing relative movement between two members comprising, in combination, an outer chuck part mounted on one of said members, a collet chuck part provided with externally tapered jaws and received with a sliding fit in said outer part, said jaws being opened and closed on relative axial movement of said chuck parts, an elongated lock-bolt supported in said collet chuck part and adapted to be axially movable therein into and out of locking engagement with a second of said members, and a rotary screw having a threaded portion received by one of said chuck parts and an oppositely threaded portion received by said lock-bolt, said rotary screw being operative on rotation in opposite directions to move said one chuck part and bolt in opposite directions to and from each other, respectively, whereby said bolt is moved out of and into locking engagement, respectively, with said second member and said one chuck part is moved axially relative to the other chuck part to effect gripping and releasing of said lock-bolt by said jaws.

8. A locking device as defined in claim 7 wherein said screw is threadedly engaged with said collet chuck part.

9. A locking device as defined in claim 7 in which the threads on said threaded portions of said screw are of different pitch.

10. A locking device as defined in claim 7, wherein said screw is engaged with said outer chuck part and said collect chuck part is fixed relative to said one member.

11. A locking device for preventing relative movement between two members comprising, in combination, an outer chuck part mounted on one of said members, a collet chuck part provided with externally tapered jaws and received with a sliding fit in said outer part, said collect chuck part being keyed to said outer chuck part for relative axial movement of said chuck parts causing said jaws to be opened and closed, an elongated lock-bolt supported in and keyed to said collet chuck part for movement axially thereof into and out of locking engagement with a second of said members, and a rotary screw having a threaded portion received by one of said chuck parts and an oppositely threaded portion received by said lock-bolt, said rotary screw being operative on rotation in opposite directions to move said one chuck part and bolt in opposite directions to and from each other, respectively, whereby said bolt is moved out of and into locking engagement, respectively, with said second member and said one chuck part is moved axially relative to the other chuck part to effect gripping and releasing of said lock-bolt by said jaws.

12. A locking device as defined in claim 11 in which one end of said screw is provided with a connector which is accessible for a tool whereby said screw may be turned in either direction.

13. A locking device for preventing relative movement between two members comprising, in combination, a chuck adapted to be mounted on one of said members and having gripping jaws, a bolt-lock supported in said chuck and arranged to be gripped and released by said jaws and to be axially movable with respect to said chuck into and out of locking engagement with the second of said members when released by said jaws, said chuck having an actuating portion by which said jaws are caused to grip said lock-bolt, and a screw having a portion threadedly engaged with the actuating portion of said chuck and an oppositely threaded portion threadedly engaged with said lock-bolt, said screw being operative on rotation in opposite directions to move said bolt into and out of locking engagement with said second member and, when said bolt is in such locking engagement, to actuate said chuck in order to grip and release said lock-bolt.

14. A locking device for a turret or the like having a plurality of spaced locking sockets comprising, in combination, a fixed support, a sleeve member rigidly mounted in said support, a collet having externally tapered jaws received with a sliding fit in said sleeve member, said collet being keyed to said sleeve member for axial movement therein in opposite directions, respectively, causing said jaws to be opened and closed, an elongated lock-bolt supported in and keyed to said collet and adapted to be axially movable therein into and out of locking engagement with a socket in said turret, and a rotary screw having a portion engageable with said collet and a threaded portion received by said lock-bolt, said rotary screw being operative on rotation in one direction to move said collet and bolt in opposite directions away from each other so that said bolt is moved into locking engagement with one of said sockets and said jaws will close and grip said bolt after said bolt is firmly engaged in said socket.

15. The combination defined in claim 14 wherein the portion of said screw which is engageable with said collet is threadedly engaged therewith, the threads being opposite to those on the portion of said screw which is threaded to said lock-bolt, whereby said screw is operative on rotation in the opposite direction to move said collet and bolt toward each other so that said jaws will open and release said bolt and said bolt is moved out of locking engagement with said socket after said bolt is released by said jaws.

16. A locking device for preventing relative movement between two members comprising, in combination, an outer chuck part fixedly mounted on one of said members and having a camming portion, a collet part provided with externally tapered jaws received with a sliding fit in said outer part with said jaws engaging the camming portion of said outer part so that the jaws are opened and closed upon axial movement of said collet part, an elongated lock-bolt supported in said collet part and adapted, when said jaws are open, to be axially movable therein into and out of locking engagement with a second of said members, means interconnecting said lock-bolt and said outer chuck part for moving said bolt into and out of locking engagement with said second member and for releasably locking said bolt to said outer chuck part against movement relative thereto, and means for moving said collet part axially relative to said outer part in order to effect gripping of said lock-bolt by said jaws.

17. A locking device for preventing relative movement between two structures comprising, in combination, a chuck mounted on one of said structures and having gripping jaws, a lock-bolt supported in said chuck and arranged to be gripped and released by said jaws and to be axially movable with respect to said chuck, when released by said jaws, into and out of locking engagement with a second of said structures, said chuck having a jaw-actuating portion by which said jaws are caused to grip said lock-bolt, and a rotary screw disposed between said lock-bolt and said jaw-actuating portion, backing against one, while being threadedly engaged with the other, and operative, on rotation in one direction, to move said lock-bolt into locking engagement with said second structure and thereupon to move said jaw-actuating member whereby said jaws rigidly grip said lock-bolt.

18. A locking device as defined in claim 17, in which one end of said screw is provided with a connector which is accessible for a tool whereby said screw may be turned in either direction.

19. A locking device for preventing relative movement between two structures comprising, in combination, a chuck mounted on one of said structures and having gripping jaws, a lock-bolt supported in said chuck and arranged to be gripped and released by said jaws and to be axially movable with respect to said chuck, when released by said jaws, into and out of locking engagement with a second of said structures, said chuck having a jaw-actuating portion by which said jaws are caused to grip said lock-bolt, and a power cylinder connected to said jaw-actuating portion, said power cylinder having a piston engageable with said lock-bolt whereby pressure applied in one direction by said piston forces said lock-bolt into locking engagement with said second structure and then causes said jaws to rigidly grip said lock-bolt.

References Cited in the file of this patent

UNITED STATES PATENTS

| | | |
|---|---|---|
| 48,120 | Warner | June 6, 1865 |
| 737,996 | Bullard | Sept. 1, 1903 |
| 927,432 | Seward | July 6, 1909 |
| 2,072,877 | Green | Mar. 9, 1937 |
| 2,234,603 | O'Connell | Mar. 11, 1941 |
| 2,464,507 | Hohwart et al. | Mar. 15, 1949 |
| 2,476,195 | Horman | July 12, 1949 |
| 2,516,642 | Murphy | July 25, 1950 |
| 2,589,554 | Killian | Mar. 18, 1952 |
| 2,657,066 | Boyd | Oct. 27, 1953 |
| 2,673,933 | Morton | Mar. 30, 1954 |
| 2,732,216 | Sloan | Jan. 24, 1956 |

FOREIGN PATENTS

| | | |
|---|---|---|
| 609,580 | France | May 17, 1926 |